(12) United States Patent
Trinh et al.

(10) Patent No.: US 8,994,798 B2
(45) Date of Patent: Mar. 31, 2015

(54) 3D TV DISPLAY SYSTEM WITH SENSOR DETECTING AN OPTICAL TOOL

(75) Inventors: Nick Q. Trinh, Minneapolis, MN (US); Joseph H. Bowser, Minneapolis, MN (US); William Y. Stafford, Minnetrista, MN (US); Thomas A. Schneider, Circle Pines, MN (US); Blake M. Johnson, St. Paul, MN (US); Kevin Huljich, Waitakere (NZ)

(73) Assignee: Target Brands, Inc., Minneapolis, MN (US)

( * ) Notice: Subject to any disclaimer, the term of this patent is extended or adjusted under 35 U.S.C. 154(b) by 602 days.

(21) Appl. No.: 13/298,916

(22) Filed: Nov. 17, 2011

(65) Prior Publication Data
US 2013/0128013 A1 May 23, 2013

(51) Int. Cl.
*H04N 13/04* (2006.01)

(52) U.S. Cl.
CPC ....... *H04N 13/0454* (2013.01); *H04N 13/0438* (2013.01); *H04N 2213/008* (2013.01)
USPC .......................................................... 348/54

(58) Field of Classification Search
CPC .......... H04N 13/0438; H04N 13/0454; H04N 2213/008
See application file for complete search history.

(56) References Cited

U.S. PATENT DOCUMENTS

| 5,293,227 | A |  | 3/1994 | Prince |  |
|---|---|---|---|---|---|
| 5,552,771 | A |  | 9/1996 | Leyden et al. |  |
| 5,636,782 | A |  | 6/1997 | Moore |  |
| 5,646,602 | A |  | 7/1997 | Gertz et al. |  |
| 6,236,435 | B1 |  | 5/2001 | Gertz |  |
| 7,053,774 | B2 |  | 5/2006 | Sedon et al. |  |
| 7,147,113 | B2 |  | 12/2006 | Obstfeld et al. |  |
| 7,316,378 | B1 | * | 1/2008 | Curran et al. | 248/298.1 |
| 7,701,339 | B2 |  | 4/2010 | Irmscher et al. |  |
| 2005/0134458 | A1 |  | 6/2005 | Leyden et al. |  |
| 2006/0061652 | A1 |  | 3/2006 | Sato et al. |  |
| 2007/0194918 | A1 |  | 8/2007 | Rabinowitz et al. |  |
| 2010/0085424 | A1 |  | 4/2010 | Kane et al. |  |
| 2010/0157425 | A1 | * | 6/2010 | Oh | 359/464 |
| 2010/0321390 | A1 | * | 12/2010 | Kim et al. | 345/427 |
| 2011/0012896 | A1 | * | 1/2011 | Ji | 345/419 |
| 2011/0157329 | A1 | * | 6/2011 | Huang et al. | 348/54 |
| 2011/0222154 | A1 | * | 9/2011 | Choi et al. | 359/464 |
| 2011/0248989 | A1 | * | 10/2011 | Park et al. | 345/419 |
| 2013/0010089 | A1 | * | 1/2013 | Maeda et al. | 348/53 |

OTHER PUBLICATIONS

Office Action from Canadian Patent Application No. 2,773,359, mailed Jul. 24, 2012 (3 pages).
Office Action from Canadian Patent Application No. 2,773,359, mailed Jan. 8, 2013 (3 pages).

* cited by examiner

*Primary Examiner* — Dave Czekaj
*Assistant Examiner* — Jill Sechser
(74) *Attorney, Agent, or Firm* — Nixon & Vanderhye P.C.

(57) ABSTRACT

A wall fixture supports at least one display screen and a display shelf. The display shelf is located adjacent the display screen and includes a holder for housing a pair of three-dimensional (3D) glasses that are tethered to the holder The display screen displays two-dimensional (2D) media content. In response to receiving an indication from a presence sensor that the 3D glasses located in a glasses holder of the display shelf have been removed from the glasses holder, 3D media content is displayed on the display monitor.

2 Claims, 4 Drawing Sheets

3D TV DISPLAY SYSTEM WITH SENSOR DETECTING AN OPTICAL TOOL

BACKGROUND

Retailers of electronics display televisions on large wall fixtures. The televisions are hung adjacent to each other so that guests can view and compare the different models before making their purchase.

One such model on display can be a three-dimensional (3D) television, which is capable of operating in a 3D mode or a regular two-dimensional (2D) mode. In a 3D mode, the 3D TV displays three-dimensional moving pictures by rendering offset images that need to be filtered separately to the left eye and the right eye. Under one technique, a 3D TV instructs a pair of shutter glasses (i.e., 3D glasses) to selectively close a left shutter or a right shutter in the glasses to control which eye of the wearer receives the image being exhibited at the moment, thereby creating stereoscopic imaging.

The discussion above is merely provided for general background information and is not intended to be used as an aid in determining the scope of the claimed subject matter.

SUMMARY

A wall fixture supports a three dimensional (3D) display system, which includes at least one 3D television and a display shelf. The display shelf is located adjacent the display screen and includes a glasses holder for housing a pair of 3D glasses tethered to the glasses holder. The 3D TV displays two-dimensional (2D) media content. In response to receiving an indication from a presence sensor that the 3D glasses previously located in the glasses holder of the display shelf have been removed from the glasses holder, 3D media content is displayed on the display monitor.

In one embodiment, the 3D media content is displayed on the 3D TV until the occurrence of a trigger event. After the trigger event, the 3D TV stops playing 3D media content and reverts back to displaying 2D media content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the disclosure describe a wall fixture in a retail store that showcases a three-dimensional (3D) television among other assorted models of televisions using a display system. The display system allows guests to be educated on 3D television product information as well as experience live 3D imaging. The display system includes a 3D television and a pair of 3D ruggedized glasses housed and tethered to a holder. When the 3D television is powered on, it continually plays and replays two-dimensional (2D) media content in the form of a 2D attract loop on the display screen. When the guest picks up the 3D ruggedized glasses from the holder, the display screen of the 3D television switches from playing 2D media content to playing 3D media content in the form of a 3D attract loop until a trigger event occurs. Upon the occurrence of the trigger event, the display monitor stops playing the 3D attract loop and reverts back to playing and replaying the 2D attract loop.

Figure 1:
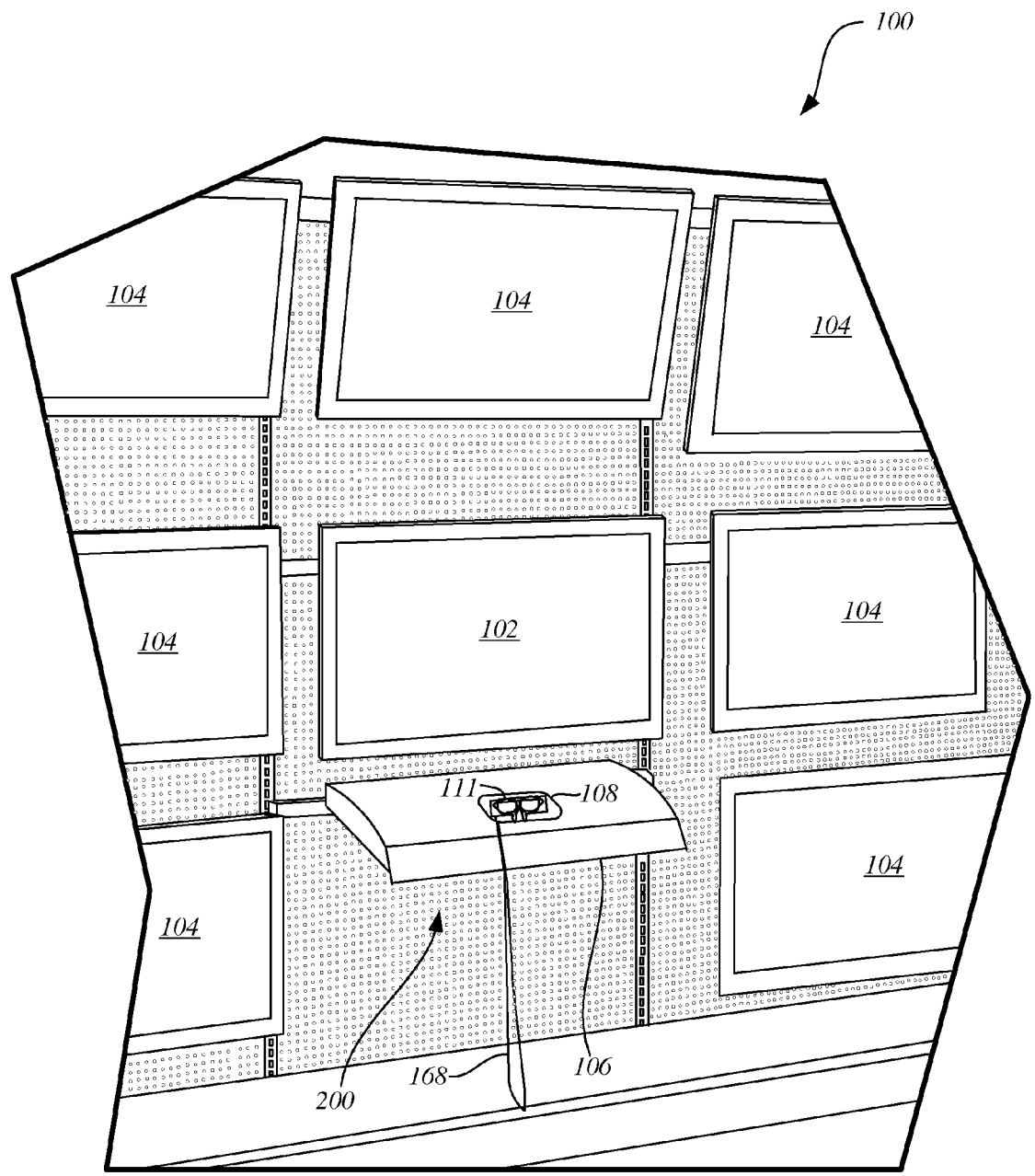
FIG. 1 illustrates a portion of a display fixture for displaying television units for purchase including a 3D television (TV) display system according to one embodiment.

FIG. 1 illustrates a portion of a wall fixture 100 in a retail store that displays television units for purchase. In particular, wall fixture 100 is configured to support and showcase a 3D television 102 amongst a plurality of other adjacent television units 104 using a display system 200. However, in another embodiment, wall fixture 100 can be configured to support and showcase a plurality of 3D televisions amongst a plurality of adjacent television units 104.

In the embodiment illustrated in FIG. 1, display system 200 includes a 3D television 102 and a display shelf 106. Display shelf 106 contains a 3D glasses holder or bucket 108, 3D glasses 111 and a tether assembly (not illustrated in FIG. 1). Display shelf 106 and therefore holder 108, 3D glasses 111 and the tether assembly are located on wall fixture 100 adjacent to and below 3D TV 102.

3D TV 102 can operate in a regular two-dimensional (2D) mode (or first mode) and a 3D mode (or second mode). In a 3D mode, the 3D TV 102 displays three-dimensional moving pictures by rendering offset images that need to be filtered separately to the left eye and the right eye. In accordance with one embodiment, the 3D mode of operation involves generating separate images for the left and right eye of a viewer at alternating times on the screen. Thus the images for the different eyes are both temporarily and geometrically offset relative to each other. To properly view 3D media content that is played on 3D TV 102, a guest must wear an optical tool or pair of 3D glasses that are given instructions as to which eye of the guest should view the image being exhibited at the moment. Since 3D TV 102 is a test display model for guests in a retail store, the 3D glasses 111 are modified to be ruggedized. In other words, 3D glasses 111 differ from 3D glasses purchased by a consumer in that they are modified to include a shroud to strengthen the 3D glasses against accidental breakage, modified to remove ear pieces, modified to remove an "on/off" switch, but keep them in a constant "on" state and modified so that a cable 168 has been semi-permanently installed into the charging port of the 3D glasses as a battery eliminator (see FIGS. 1 and 2). In addition, 3D glasses 111 are coupled to the tether assembly, which provides a constant mechanical connection to display shelf 106 even when the 3D glasses are removed from 3D glasses holder 108 and worn by the guest.

Figure 2:
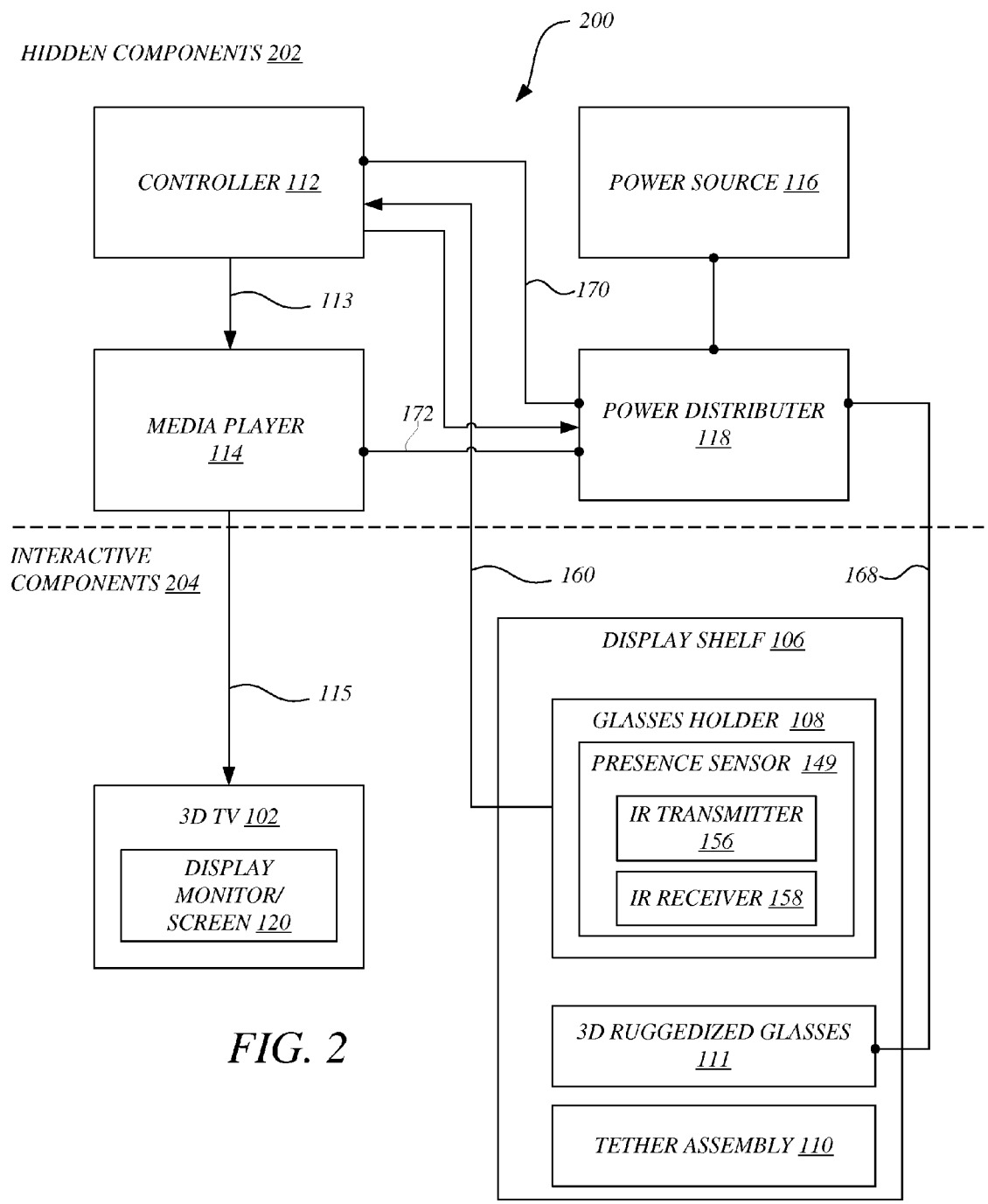
FIG. 2 illustrates a schematic block diagram illustrating the components of the 3D TV display system illustrated in FIG. 1.

FIG. 2 illustrates a schematic diagram of display system 200. Components of display system 200 are divided into two categories: interactive components 202 (illustrated below the dashed line) and hidden components 204 (illustrated above the dashed line). Interactive components 202 are those components that the guest in the retail store can interact with to experience live 3D TV. Exemplary interactive components include 3D TV 102, exterior portions of display shelf or fixture component 106, 3D glasses holder or bucket 108, 3D glasses 111 and tether assembly 110. In one embodiment, tether assembly 110 can include a retractable cord that winds on a recoiler. Exemplary hidden components are illustrated in FIG. 2 and include a controller 112, a media player 114, a power source 116 and a power distributor 118. Hidden components 204 are those components that are hidden from view and are not for interaction by the guest. Such hidden components can be located within display shelf 106 or located behind wall fixture 100. For example and as better illustrated in FIG. 4, controller 112, media player 114 and power distributor 118 can be located within display shelf 106.

As illustrated in FIG. 2, controller 112 is electronically coupled to media player 114 by a cable 113, such as a four-conductor cable. Media player 114 is electrically coupled to 3D TV 102 by a cable 115, such as a HDMI cable, and is configured to play 2D media content or 2D attract loop, which is stored in a 2D file, on display monitor or screen 120 of 3D TV 102 or play 3D media content or a 3D attract loop, which is stored in a 3D file, on display monitor or screen 120 of 3D TV 102.

Figure 3:
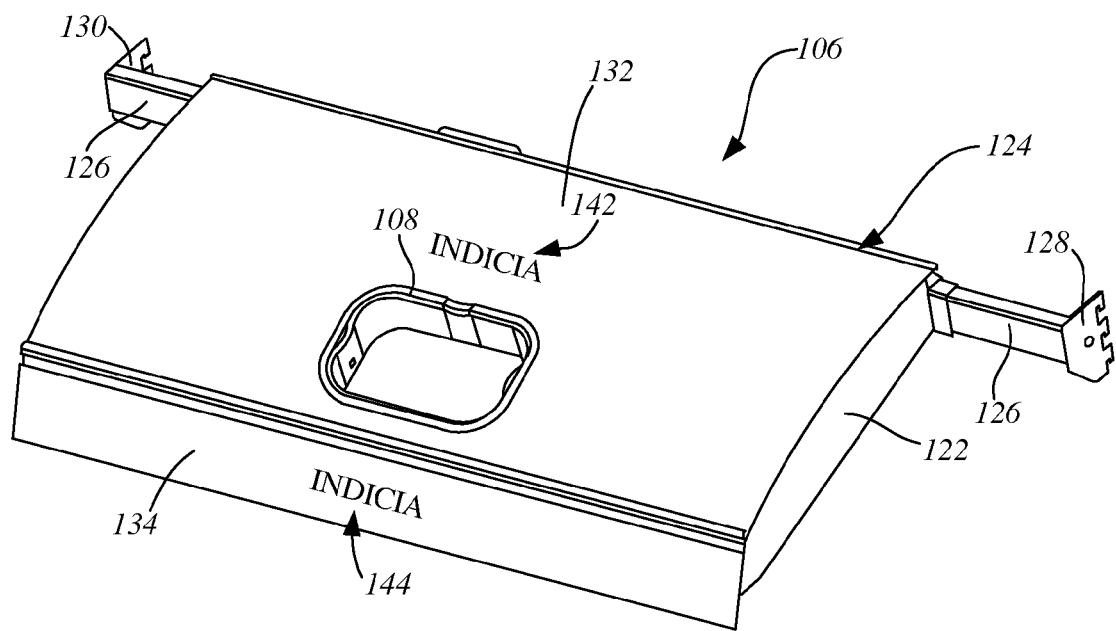
FIG. 3 illustrates a perspective view of a display shelf of the 3D TV display system illustrated in FIG. 1.
Figure 4:
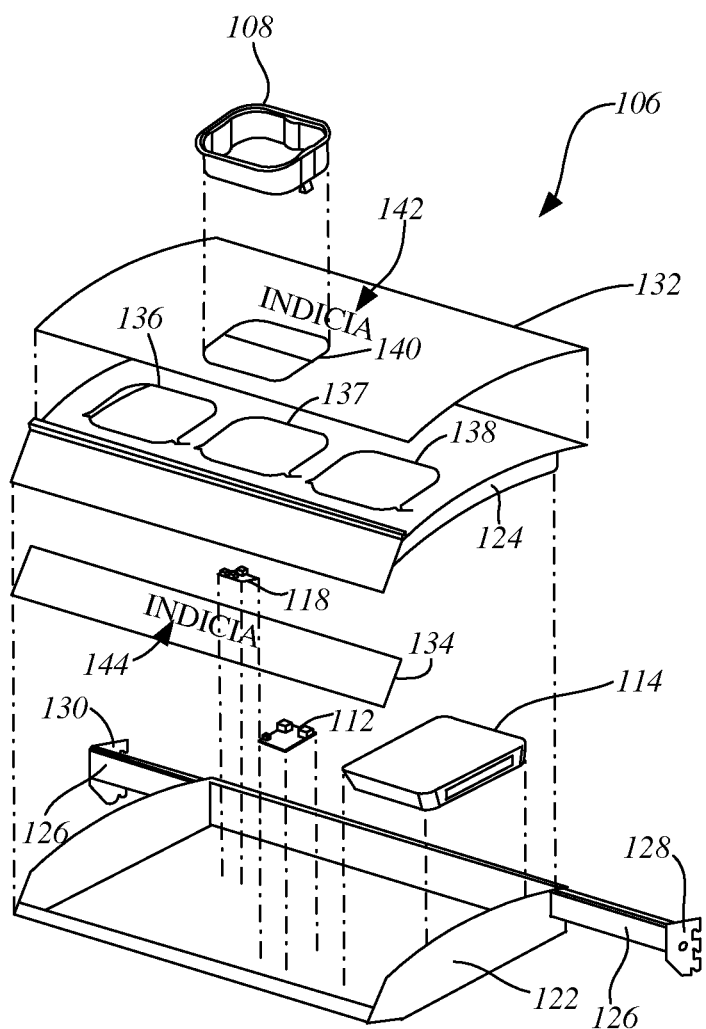
FIG. 4 illustrates a simplified exploded view of the display shelf illustrated in FIG. 3.

FIG. 3 illustrates an enlarged perspective view of the display shelf or fixture component 106 illustrated in FIG. 1, while FIG. 4 illustrates a simplified exploded view of display shelf or fixture component 106. Display shelf 106 includes a base 122, a cover 124, glasses holder or bucket 108, a towel bar 126, a main graphic 132 and a front edge graphic 134. As illustrated in FIG. 4, base 122 is configured to receive cover 124 and configured to support controller 112, media player 114, power distributor 118 and glasses holder or bucket 108. While controller 112, media player 114 and power distributor 118 are hidden from view from the guest (as previously described) and contained in display shelf 106, glasses holder or bucket 108 is exposed and configured to hold 3D glasses 111 and tether assembly 110.

Towel bar 126 is coupled to base 122 and includes a first mount hook 128 at a first end and a second mount hook 130 at an opposing second end. First and second mount hooks 128 and 130 are configured to mount to wall fixture 100 (FIG. 1) to support display shelf 106 at an angle from the vertical direction of wall fixture 100. Cover 124 includes a plurality of openings 136, 137 and 138. Each opening is configured to receive a glasses holder or bucket 108. In one embodiment and as illustrated in FIGS. 1, 3 and 4, however, only a select one of the plurality of openings will receive a glasses holder or bucket while the other openings in cover 124 will be hidden from view by main graphic 132.

As illustrated in FIGS. 1, 3 and 4, main graphic 132 includes an opening 140 that aligns with opening 137 in cover 124. It should be realized that opening 140 can be positioned in other locations on main graphic 132 such that it aligns with any of the other openings 136 and 137. In other embodiments, however, graphic 132 can include more than one opening 140 such that more than one glasses holder or bucket 108 can be supported by display shelf 106. Main graphic 132 as well as front edge graphic 134 include printed indicia 142 and 144. For example, indicia 142 and 144 can include product information regarding 3D TV 102 as well as operational information for using the 3D glasses 111 to view live 3D images on 3D TV 102.

Figure 5:
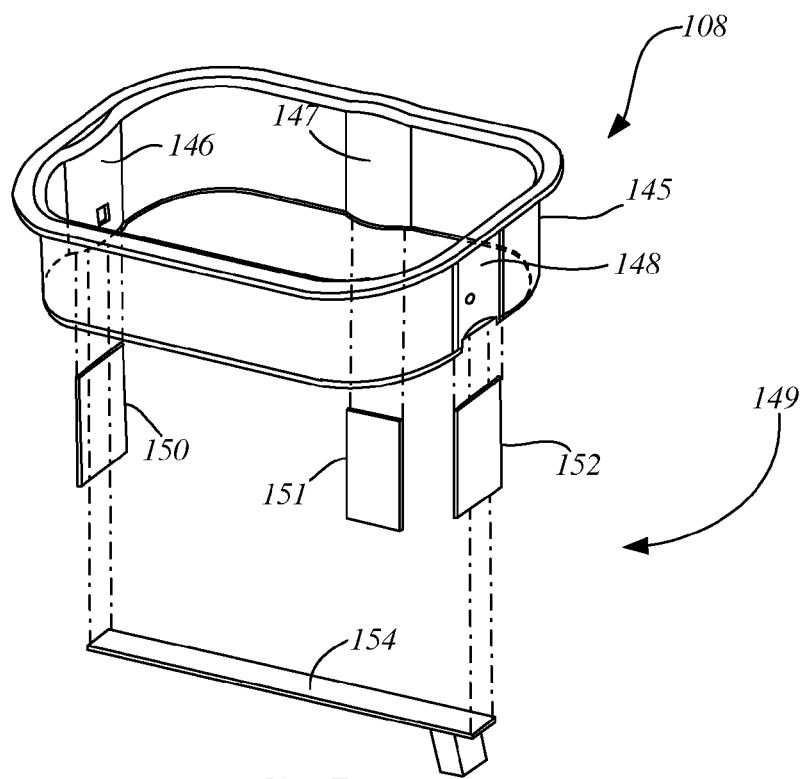
FIG. 5 illustrates a simplified exploded view of a 3D glasses holder of the display shelf illustrated in FIG. 3.

FIG. 5 illustrates a simplified exploded view of glasses holder or bucket 108 with its bottom panel removed. Glasses holder or bucket 108 includes a peripheral wall 145 and a proximity/presence sensor or sensor assembly 149 (FIG. 2). Presence sensor 149 is capable of detecting the presence of nearby objects without any physical contact. In one example, presence sensor 149 can be a sensor that emits an electromagnetic field (i.e., a magnetic sensor). In another example, presence sensor 149 can be a sensor that emits a beam of electromagnetic radiation (i.e., a photoelectric sensor). In still other embodiments, presence sensor 149 can be a sensor that uses capacitance or inductance between the sensor and the target (i.e., inductive and capacitive sensors). Each type of sensor target (the object being sensed) requires a different type of sensor. For example, capacitive or photoelectric sensors can be suitable for plastic targets, while inductive and magnetic sensors are suitable for metallic targets.

In the embodiments illustrated in FIG. 2, presence sensor 149 is a photoelectric sensor that emits a beam of infrared electromagnetic radiation. While presence sensor 149 can emit infrared to sense 3D glasses using direct reflection or reflection with a reflector, in the embodiment illustrated in FIGS. 2-5, presence sensor 149 uses a through light beam to detect a target when the target interrupts the light beam between an emitter and a receiver. Peripheral wall 145 has a plurality of slots 146, 147 and 148. Each of slots 146, 147 and 148 receive one of a plurality of sensor components 150, 151 and 152 of presence sensor 149. Presence sensor 149 also includes a connector 154 that runs along the bottom of glasses holder 108 from one point on peripheral wall 145 to another point on the peripheral wall.

In one embodiment and as illustrated in FIG. 5, at least one of the sensor components 150, 151 and 152 is an infrared (IR) transmitter or blaster 156 (FIG. 2) and at least one of the sensor components 150, 151 and 152 is an infrared (IR) receiver 158 (FIG. 2). Together, sensor components 150, 151 and 152 act to detect the presence of the optical tool or 3D glasses 111 in glasses holder or bucket (i.e., a first position) 108 or to detect the absence of the optical tool or 3D glasses 111 in the glasses holder or bucket (i.e., a second position) 108. In other words, sensor components 150, 151 and 152 are used to determine whether the 3D glasses 111 are positioned within the peripheral wall 145 of glasses holder or bucket 108 or not. In particular, IR transmitter 156 transmits at least one IR light beam. If IR receiver 158 fails to receive the IR beam, the 3D glasses are present in the glasses holder 108 and no indication or signal is transmitted to controller 112. If IR receiver 158 receives the IR beam, a first signal or first indication is electrically transmitted to controller 112 through cable 160 via connector 154 indicating that 3D glasses 111 are absent. For example, cable 160 can be a RJ-45 cable and connector 154 can be an RJ-45 connector for electrically coupling the sensor components 150, 151 and 152 to cable 160.

In one embodiment, one of the sensor components 150, 151 and 152 is an IR transmitter and the other of the two sensor components 150, 151 and 152 are IR receivers. Therefore, controller 112 receives a first signal or first indication only if the two IR receivers both receive IR beams transmitted by the IR transmitter.

In operation, a guest approaches the display system 200, which is mounted to wall fixture 100. As the guest approaches, media player 114 renders 2D media content or 2D images (i.e., media content in the first mode) on the display screen 120 of 3D TV 102 or, in another embodiment, renders 2D media content on a plurality of display screens of a plurality of 3D TVs, thereby ensuring that display screen 120 does not look distorted to the naked eye as would be the case if it were displaying 3D images. The guest decides to view live 3D imaging, so picks up 3D glasses 111 from glasses holder or bucket 108.

Upon the guest picking up the glasses, controller 112 receives a first indication from presence sensor 149 that 3D glasses 111 have been removed from glasses holder or bucket 108. Upon receiving the first signal or first indication, controller 112 instructs media player 114 to display 3D media content or 3D images (i.e., media content in the second mode) on display monitor or screen 120 of 3D TV 102 or 3D media content on the plurality of display screens of the plurality of 3D TVs. The 3D media content or 3D images are displayed until the occurrence of a trigger event. Upon the occurrence of the trigger event, controller 112 instructs media player 114 to stop playing 3D media content and revert back to playing 2D media content or 2D images on display screen 120 or 3D TV 102.

In one exemplary embodiment, the trigger event can include a lapse of a predetermined amount of time since controller 112 received the first signal or first indication. For example, the trigger event can include a lapse of five minutes since controller 112 received the first signal or first indication from presence sensor 149. In another exemplary embodiment, the trigger event can include a lapse of a predetermined number of times the 3D media content. In particular, the 3D media content includes a set of images and/or videos that run for a certain length of time. This set of images and/or videos can be called a content loop. Therefore, the trigger event can include a lapse of a predetermined number of content loops played by media player 114. For example, the trigger event can include a lapse of three content loops played by media player 114. In yet another exemplary embodiment, the trigger event can include the return of 3D glasses 111 to glasses holder or bucket 108. In other words, a second indication or a second signal from the presence sensor can occur if 3D glasses 111 have been returned to the glasses holder 108. The second indication or signal triggers controller 112 to instruct media player 114 to stop playing 3D media content and revert back to displaying 2D media content on display screen 120 of 3D TV 102.

The above described embodiments describe various trigger events that ensure 3D media content does not continue to be displayed if the 3D glasses are abandoned without being returned to glasses holder or bucket 108. This prevents other guests from approaching display system 200 and viewing 3D TV 102 in a 3D mode without wearing the 3D glasses. To reset display system 200, abandoned 3D glasses need only be returned to glasses holder or bucket 108 before putting on the glasses to view live 3D imaging.

In the embodiment where display shelf 106 includes more than one pair of 3D glasses 111 and more than one glasses holder or bucket 108 each having associated presence sensors 149 and tether assembly 110, controller 112 instructs media player 114 to display 3D media content upon at least one of the presence sensors indicating that at least one of the 3D glasses 111 has been removed from one of glasses holders 108. In this embodiment, the occurrence of a trigger event occurs based only on the last pair of 3D glasses that are picked up for use.

For example, a second pair of 3D glasses is subsequently picked up by a second guest after a first pair of 3D glasses is picked up by a first guest. In this example, the trigger event is based on the second 3D glasses. In other words, if the trigger event is a lapse of a predetermined amount of time, the lapse of time is based on the lapse of time since controller 112 received an indication from a presence sensor that the second 3D glasses have been removed from glasses holder 108. In addition and in one embodiment, both pairs of 3D glasses need to be returned to their glasses holder or bucket in order for the display screen 120 displaying 3D media content to revert back to displaying 2D media content.

Power distributor 118 supplies 3D glasses 111 with power from power source 116 via cable 168 (FIGS. 1 and 2). For example, cable 168 can be a USB extension cable, a DC power cable, an AC power cable and etc. In the alternative, 3D glasses 111 can be powered by an internal battery, in which case there would be no cable 168. In addition, power distributor 118 also supplies power to controller 112 via cable 170 and media player 114 via cable 172. For example, cables 170 and 172 can be barrel jack cables.

In one embodiment, power distributor 118 powers 3D glasses 111 at all times. In an alternative embodiment, when controller 112 receives an indication or signal from presence sensor 149 that 3D glasses 111 are removed from glasses holder 108, controller 112 also instructs power distributor 118 to supply 3D glasses 111 with power from power source 116.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of displaying content on a display monitor comprising:
    displaying two-dimensional (2D) media content on a display monitor of a display system;
    receiving an indication from a presence sensor that three-dimensional (3D) glasses have been removed from a glasses holder of a display shelf; and
    displaying 3D media content on the display monitor in response to the indication that the 3D glasses have been removed from the glasses holder,
    wherein displaying 3D media content on the display monitor in response to the indication that the 3D glasses have been removed from the glasses holder comprises playing the 3D media content until the occurrence of a trigger event after which the display monitor stops displaying 3D media content and reverts back to displaying 2D media content, wherein the trigger event comprises (1) a lapse of a predetermined amount of time or (2) an indication that the media player has played a predetermined number of content loops of the 3D media content, and wherein after the display monitor reverts back to displaying 2D media content by the trigger event (1) or (2), the display system displaying only 2D media content after reverting back to displaying 2D media content until the system is reset, and the display system is reset only after receiving an indication from the presence sensor that the 3D glasses have been returned to the glasses holder.

2. The method of claim 1, further comprising:
    receiving an indication from the presence sensor that the 3D glasses are present in the glasses holder; and
    resuming the displaying of 2D media content on the display monitor in response to receiving the indication that the 3D glasses are present in the glasses holder.

* * * * *